United States Patent
Goss

(10) Patent No.: US 11,059,535 B1
(45) Date of Patent: Jul. 13, 2021

(54) MECHANISM FOR ADJUSTING BACKREST OF A MOTORCYCLE

(71) Applicant: William Goss, Marysville, WA (US)

(72) Inventor: William Goss, Marysville, WA (US)

( * ) Notice: Subject to any disclaimer, the term of this patent is extended or adjusted under 35 U.S.C. 154(b) by 226 days.

(21) Appl. No.: 16/244,230

(22) Filed: Jan. 10, 2019

(51) Int. Cl.
 *B62J 1/28* (2006.01)

(52) U.S. Cl.
 CPC .................................. *B62J 1/28* (2013.01)

(58) Field of Classification Search
 USPC .......................................................... 297/383
 See application file for complete search history.

(56) References Cited

U.S. PATENT DOCUMENTS

| | | | | |
|---|---|---|---|---|
| 3,822,917 A | * | 7/1974 | George | B62J 1/28 297/215.12 |
| 3,866,250 A | * | 2/1975 | Bradford | A47C 20/043 5/652 |
| 4,032,189 A | * | 6/1977 | Benavente | B62J 1/28 297/352 |
| 5,441,330 A | * | 8/1995 | Rojas | B62J 1/28 297/188.05 |
| 6,224,081 B1 | | 5/2001 | Wayman et al. | |
| 6,761,401 B1 | | 7/2004 | McGlynn | |

* cited by examiner

*Primary Examiner* — Sarah B McPartlin
(74) *Attorney, Agent, or Firm* — Sanchelima & Associates, P.A.; Christian Sanchelima; Alexander Rodriguez

(57) ABSTRACT

The present invention is a mechanism for adjusting backrest of a seat of a motorcycle that moves backrest towards and away from seat thereby adjusting sitting space as desired for different users. The mechanism includes a connecting bracket and a sliding bracket. Connecting bracket connects backrest and central bracket which is a part of the motorcycle that conventionally connects backrest to fender bracket disposed on a fender. Sliding bracket is connected at a bottom portion of central bracket and slides on fender bracket. When sliding bracket slides, central bracket and connecting bracket slides, thereby sliding backrest towards and away from seat of motorcycle. Thus, as desired space between backrest and seat can be increased or reduced to provide comfortable sitting on seat.

12 Claims, 4 Drawing Sheets

MECHANISM FOR ADJUSTING BACKREST OF A MOTORCYCLE

BACKGROUND OF THE INVENTION

1. Field of the Invention

The present disclosure relates to a backrest of a motorcycle. More particularly, the present disclosure relates to a mechanism for adjusting backrest of a motorcycle such that backrest moves towards and away from a seat.

2. Description of the Related Art

Owing to confined space of pillion seats sandwiched between a pillion backrest and a rider backrest, pillion riders feel uncomfortable to travel a long journey. Hence, there is a need for a mechanism that adjusts a backrest of a motorcycle so that a rider can adjust by increasing and decreasing space between a seat and backrest and enjoy a comfortable ride.

Several designs for backrest adjustment for motorcycles have been designed in the past. None of them, however, includes a mechanism for adjusting backrest that slides backrest towards and away from a seat of a motorcycle and is structurally compact and featured to provide more space between a backrest and a seat of a motorcycle.

Applicant believes that a related reference corresponds to a U.S. Pat. No. 6,761,401 filed by Leo McGlynn for Telescoping motorcycle seat backrest. The Leo reference discloses a motorcycle seat backrest that telescopes up and down, to remain out of the way when not needed and to be adjustable as to height when needed. However, the backrest is not adjustable for increasing sitting space between the backrest and seat.

Another related application is U.S. Pat. No. 6,224,081 by Harley-Davidson Motor Co Group Inc. for an adjustable backrest for a motorcycle. The patent '081 discloses a backrest that is provided with a torsion adjustment. However, the adjustable backrest disclosed in the reference '081 is silent on increasing space between the backrest and seat.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a mechanism for adjusting backrest of a seat of a motorcycle that moves backrest towards and away from seat thereby adjusting sitting space as desired.

It is yet another object of the present invention to provide a structurally compact mechanism for adjusting backrest of a seat of a motorcycle for providing sufficient space between backrest and space.

It is still another object of the present subject matter to provide a mechanism for adjusting backrest of a seat of a motorcycle that is easily retrofitted in an existing motorcycle or can be fitted in a new motorcycle.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
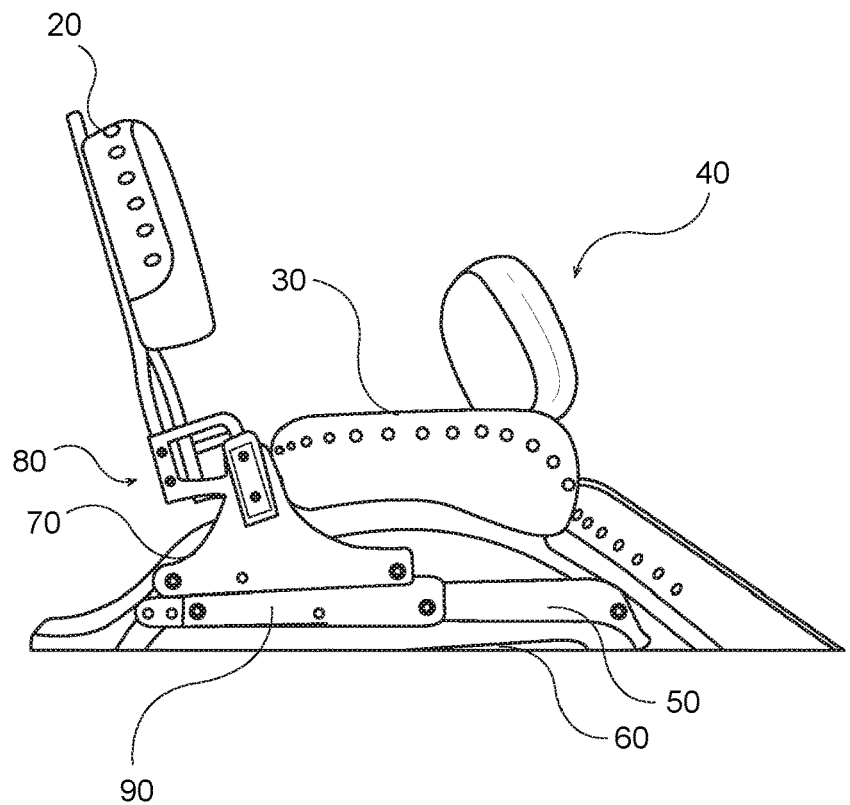
FIG. 1 represents an isometric view of a mechanism 10, in an operating environment, for adjusting a backrest 20 of a motorcycle 40. Adjustment mechanism includes a connecting bracket 80 that connects backrest 20 and a central bracket 70 and a sliding bracket 90 connected with the central bracket 70 to slide on a fender bracket 50, wherein backrest 20 is close to a seat 30 of a motorcycle 40.
Figure 2:
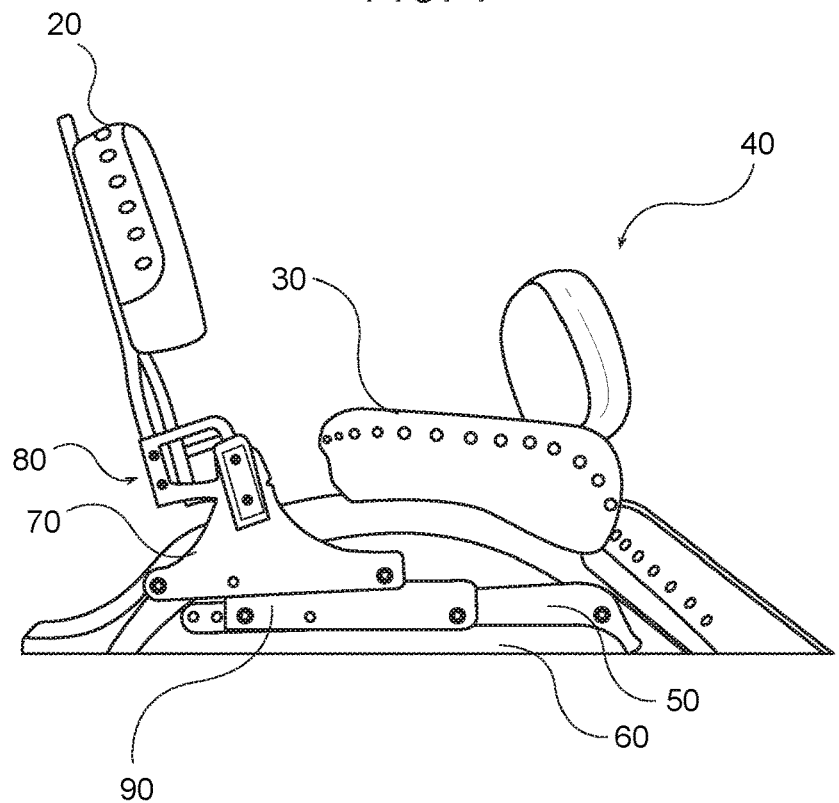
FIG. 2 represents an isometric view of adjusting mechanism 10 of FIG. 1, wherein backrest 20 is far away from seat 30 of motorcycle 40.
Figure 3:
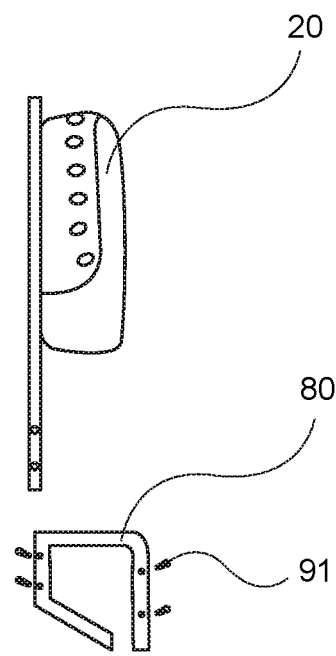
FIG. 3 shows an exploded view of adjusting mechanism 10.
Figure 3:
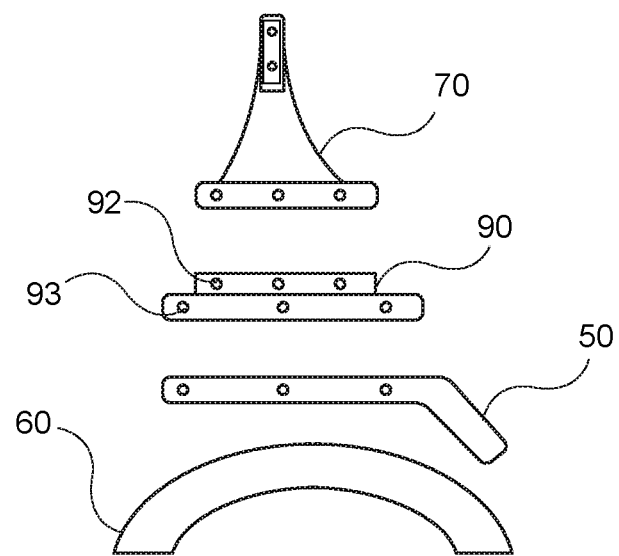
Figure 4:
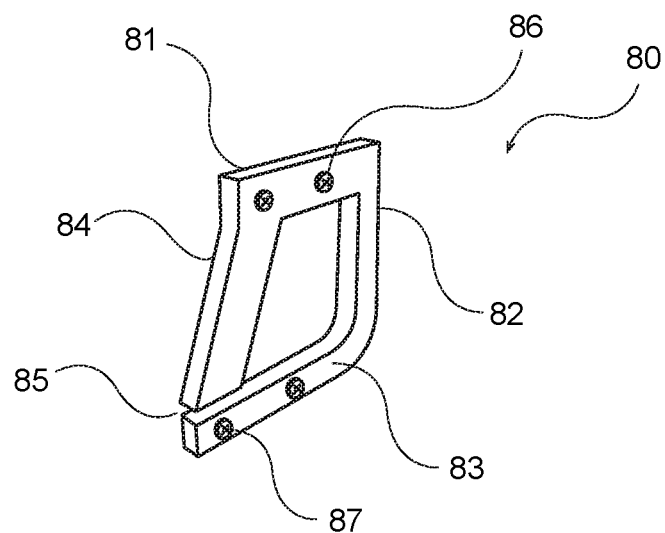
FIG. 4 illustrates a perspective view of connecting bracket 80.
Figure 5:
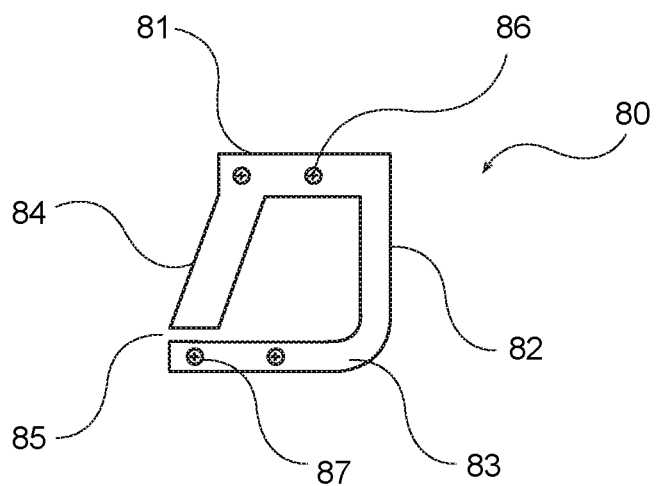
FIG. 5 illustrates a front view of connecting bracket 80.
Figure 6:
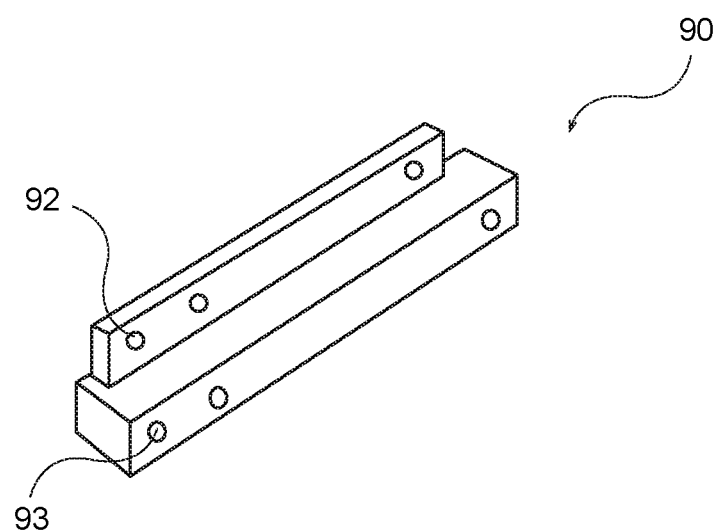
FIG. 6 illustrates a perspective view of sliding bracket 90.
Figure 7:
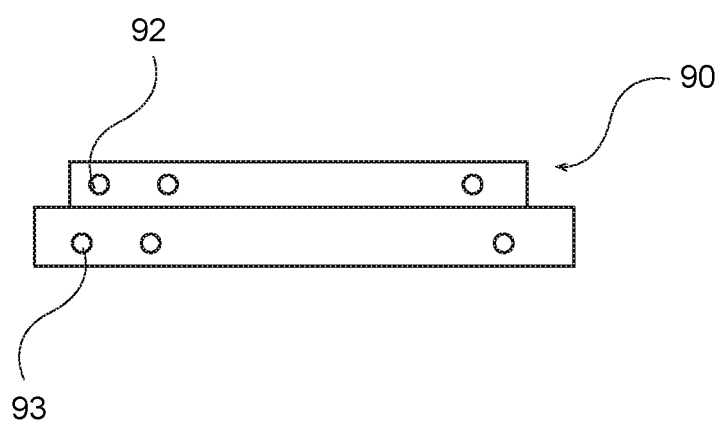
FIG. 7 illustrates a front view of sliding bracket 90.

Referring now to the drawings, FIGS. 1-7, where the present invention is generally referred to with numeral 10, it can be observed that a mechanism for adjusting a backrest 20 of a seat 30 of a motorcycle 40 defined with a fender bracket 50 disposed on a fender 60 and a central bracket 70, in accordance with one embodiment, is provided that includes a connecting bracket 80 and a sliding bracket 90.

Connecting bracket 80 connects backrest 20 and central bracket 70 which is generally a part of a motorcycle. Generally, central bracket 70, herein the present disclosure refers to a bracket that conventionally connects backrest 20 to fender bracket 50 in existing motorcycles. In one embodiment, connecting bracket 80 is substantially square in shape, as clearly illustrated in FIGS. 4 and 5. Square shaped connecting bracket 80 having four sides 81, 82, 83, and 84 of which adjacently disposed sides 83 and 84 is provided with a gap 85 therebetween and side 84 is taper. Square shape of connecting bracket 80 creates an additional structural space between backrest 20 and central bracket 70.

Typically, connecting bracket 80 is connected to backrest 20 and central bracket 70 by fasteners 91 through holes 86 provided on connecting bracket 80.

Sliding bracket 90 is connected at a bottom portion of central bracket 70. Sliding bracket 90 has an upper portion and a lower portion. Upper portion is connected to central bracket 70. Lower portion of sliding bracket 90 selectively slides on fender bracket 50 such that sliding bracket 90 slides central bracket 70 and connecting bracket 80 and thereby slides backrest 20 towards and away from seat 30.

Typically, sliding bracket 90 with holes 92 is connected to central bracket 70 by fasteners 91 and sliding bracket 90 with holes 93 is connected to fender bracket 50 by fasteners 91.

Thus, by adding connecting bracket 80 and sliding bracket 90, backrest 50 can move approximately around 4 inches such that a sufficient space is formed between backrest 20 and seat 30. Though, as mentioned one can increase space between backrest 20 and seat 30 around 4 inches, however, space can be increased above 4 inches or decreased below 4 inches as per various models of motorcycles.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A mechanism for a motorcycle, said mechanism comprising:
    a) a fender of said motorcycle, said fender defined by a fender bracket;
    b) a backrest of said motorcycle, said backrest connected to said fender bracket with a central bracket, said central bracket being entirely above of said fender bracket, said fender bracket having a curved distal end which extends downwardly away from said backrest;
    c) a connecting bracket introduced to connect said backrest and said central bracket, said connecting bracket being entirely below said backrest; and
    d) a sliding bracket connected with said central bracket and selectively slidable on said fender bracket to adjust positioning of said backrest, said sliding bracket including a top portion and a lower portion in constant abutting contact with one another, said top portion extending a partial length of said lower portion.

2. The mechanism as claimed in claim 1, wherein said connecting bracket defined with a substantially square frame having a gap between a pair of adjacently disposed sides of which one is a tapered side.

3. The mechanism as claimed in claim 1, wherein said sliding bracket is longitudinal.

4. The mechanism as claimed in claim 1, wherein said connecting bracket is connected to said backrest and said central bracket by fasteners.

5. The mechanism as claimed in claim 1, wherein said sliding bracket is connected to said central bracket by fasteners.

6. The mechanism as claimed in claim 1, wherein said central bracket is tapered and T-shaped.

7. The mechanism as claimed in claim 1, wherein said connecting bracket includes a bottom side which extends diagonally between lateral sides of said connecting bracket.

8. The mechanism as claimed in claim 1, wherein said lower portion has a width greater than that of said top portion.

9. The mechanism as claimed in claim 1, wherein said sliding bracket includes a plurality of holes.

10. The mechanism as claimed in claim 1, wherein said connecting bracket includes a plurality of through holes about a perimeter thereof.

11. The mechanism as claimed in claim 1, wherein said mechanism includes a seat, said seat being entirely above of said sliding bracket.

12. A mechanism for a motorcycle, said mechanism consisting of:
    a) a fender of said motorcycle, said fender defined by a fender bracket;
    b) a backrest of said motorcycle, said backrest connected to said fender bracket with a central bracket, said central bracket being entirely above of said fender bracket, said fender bracket having a curved distal end which extends downwardly away from said backrest, said central bracket is tapered and T-shaped;
    c) a connecting bracket introduced to connect said backrest and said central bracket, said connecting bracket being entirely below said backrest, said connecting bracket includes a bottom side which extends diagonally between lateral sides of said connecting bracket, said bottom side including a spacing therebetween; and
    d) a sliding bracket connected with said central bracket and selectively slidable on said fender bracket to adjust positioning of said backrest, said sliding bracket including a top portion and a lower portion in constant abutting contact with one another, said top portion extending a partial length of said lower portion, said lower portion has a width greater than that of said top portion.

* * * * *